Jan. 27, 1959  E. P. NEHER  2,871,025
STEERING KNUCKLE MOUNTING
Filed Oct. 17, 1955  2 Sheets-Sheet 1

INVENTOR
*Eldon Paul Neher*

BY *McCoy, Graeme & Te Grotenhuis*
ATTORNEYS

Jan. 27, 1959     E. P. NEHER     2,871,025
STEERING KNUCKLE MOUNTING
Filed Oct. 17, 1955     2 Sheets-Sheet 2

INVENTOR
*Eldon Paul Neher*

BY *McCoy, Greene + to Grotenhuis*
ATTORNEYS

United States Patent Office 2,871,025
Patented Jan. 27, 1959

2,871,025

STEERING KNUCKLE MOUNTING

Eldon Paul Neher, Logansport, Ind., assignor to The General Tire and Rubber Company, Akron, Ohio, a corporation of Ohio Application October 17, 1955, Serial No. 540,692

5 Claims. (Cl. 280—96.2)

This invention relates to front wheel suspensions and more particularly to the mounting of the steering knuckle which carries the wheel spindle.

The present invention is applied to mountings of the type in which the upper and lower ends of the steering knuckle are connected to supporting members by joints which permit the knuckle and wheel spindle to have substantially horizontal swinging movements, and comprises an improved steering knuckle mounting which includes pivotal connections between the steering knuckle and the supporting members which permit limited universal movements and which are resiliently yieldable to cushion impact and braking shocks and to dampen vibrations which would otherwise be transmitted to the supporting members.

In the steering knuckle mounting of the present invention the knuckle is connected at its upper and lower ends to the supporting members by ball and socket joints which include an elastic rubber bushing that is formed to fit around the ball and that is held under radial compression between the ball and the socket within which the ball has turning movements, the elastic rubber bushing being held under sufficient radial compression to prevent turning thereof within the socket or upon the ball. The socket members permit limited relative movement of the balls with respect to the sockets in all directions, but a greater amplitude of relative horizontal angular movement is permitted by reason of elongated horizontally disposed slots in the socket members through which the ball carrying members extend.

The invention has for an object to provide a steering knuckle mounting of the universal joint type which is economical because its cost of manufacture is low, no machined and hardened bearing surfaces being required, and because its cost of upkeep is low, deterioration due to abrasion of bearing surfaces being eliminated and lubrication being unnecessary.

A further object is to provide resiliently yieldable pivotal connections for the steering knuckle which will absorb road impact and braking shocks.

A further object is to provide a steering knuckle which imposes a yielding resistance to horizontal swinging movements of the vehicle wheel, which serves to dampen torsional vibrations and reduce wheel wobble, and which exerts a force on the wheels when they are swung out of their normal position that tends to automatically return them to their normal position when the steering thrust is released.

Reference should be had to the accompanying drawings forming a part of this specification in which.

Figure 1:
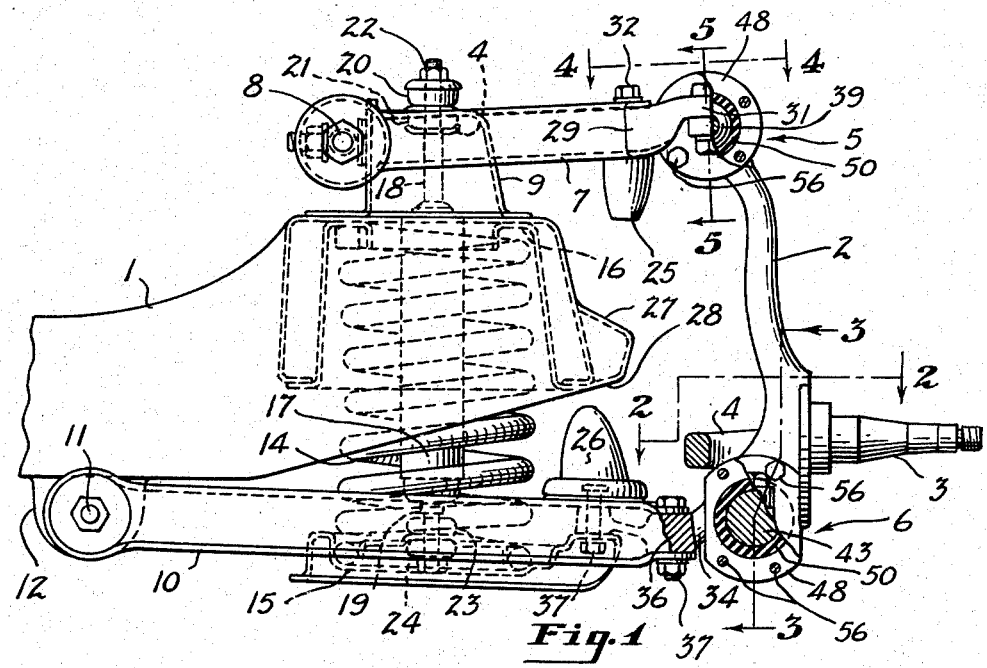
Figure 1 is a front elevation of a steering head in which the steering knuckle mounting of the present invention is employed.

In the accompanying drawings the invention is shown applied to a steering head which is connected to an end of a front frame cross bar 1, the steering head including a steering knuckle 2 in the form of a substantially upright member which carries an outwardly projecting wheel receiving spindle 3 and which has a steering arm 4 connected thereto for attachment to a tie rod (not shown) that connects it to the steering knuckle on the opposite side of the vehicle and that is shifted laterally by a suitable steering mechanism.

The knuckle 2 is supported at its upper and lower ends by pivotal connections indicated generally by the numerals 5 and 6. The upper end of the steering knuckle 2 is connected by the pivot 5 to the outer end of an upper link 7 which projects beyond the end of the cross member 1 and which is connected at its inner end by a substantially horizontal pivot 8 to a bracket 9 attached to the top of the cross member 1. The lower end of the knuckle 2 is connected to the outer end of a lower link 10 which is of greater length than the link 7, the inner end of the link 10 being connected by a substantially horizontal pivot 11 to a bracket 12 on the underside of the cross member 1. The end of the cross member 1 is yieldably supported on the wheel assembly by means of a compression coil spring 14 that is mounted on a seat 15 carried by the lower link 10 and which engages at its upper end a seat 16 within the cross member 1. A shock absorber 17 is provided to limit movements of the cross member 1 with respect to the lower link 10, the shock absorber being of the telescopic cylinder type having upper and lower axially extending rods 18 and 19 attached to the cylinder, the upper rod 18 extending through the top of the bracket 9 and the lower rod 19 extending through the seat 15 carried by the lower link. A resilient connection between the upper rod 18 and the bracket 9 is provided by elastic rubber collars 20 and 21 on the rod 18 which engage with the top and bottom faces of the bracket top wall and which are held in clamping engagement with the bracket by means of a nut 22. The rod 19 is yieldably connected to the spring seat 15 by means of rubber collars 23 and 24 attached to the rod 19 and engaging the top and bottom faces of the seat 15. Rubber bumpers 25 and 26 are attached to the underside of the link 7 and to the upper side of the link 10 adjacent the outer ends of the links and these bumpers are engageable with upwardly and downwardly facing shoulders 27 and 28 formed on the outer end of the cross member 1, the bumpers 25 and 26 serving to limit the vertical movement of the cross bar 1 with respect to the links 7 and 10.

Figure 2:
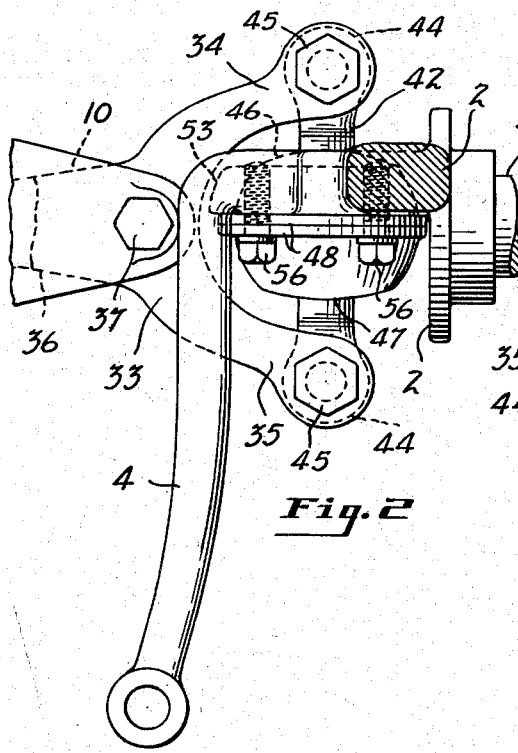
Fig. 2 is a fragmentary horizontal section taken on the line indicated at 2—2 in Fig. 1.
Figure 4:
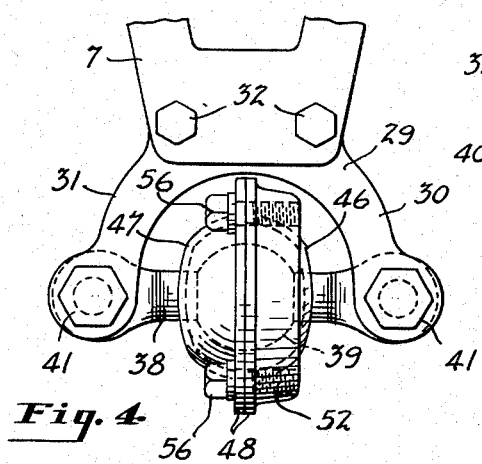
Fig. 4 is a fragmentary top plan view of the upper steering knuckle joint, viewed as indicated at 4—4 in Fig. 1.

The improvement of the present invention resides in the mounting of the steering knuckle in the steering head. The upper end of the knuckle 2 is connected to a U-shaped attaching member 29 carried by the outer end of the upper link 7 and having front and rear outwardly projecting arms 30 and 31 as best shown in Fig. 4, the attaching member being rigidly secured to the link 7 by means of laterally spaced bolts 32. The lower end of the steering knuckle 2 is connected to an attaching member 33 carried by the lower link 10 at its outer end and having front and rear outwardly extending arms 34 and 35 as best shown in Fig. 2. The lower attaching member has an inwardly extending portion 36 that is rigidly attached to the outer end of the lower link 10 by means of longitudinally spaced attaching bolts 37.

Figure 3:
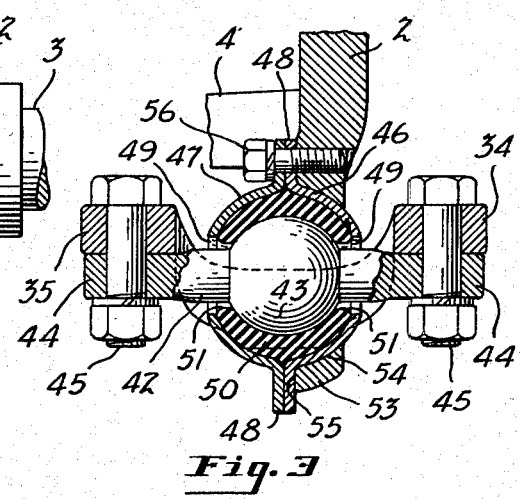
Fig. 3 is a fragmentary vertical section taken on the line indicated at 3—3 in Fig. 1.
Figure 5:
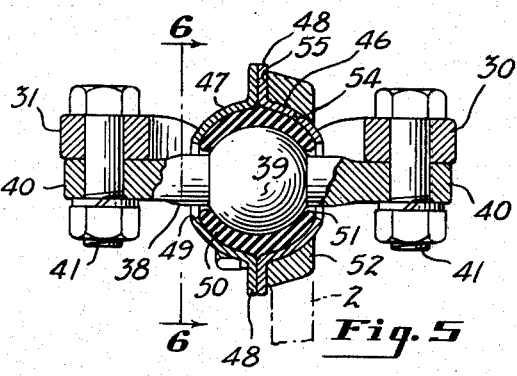
Fig. 5 is a fragmentary vertical section taken on the line indicated at 5—5 in Fig. 1.
Figure 7:
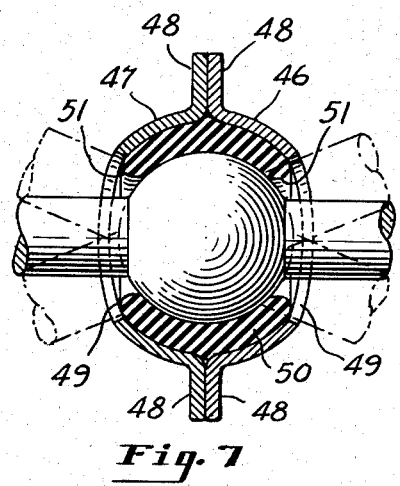
Fig. 7 is a horizontal section on an enlarged scale through one of the knuckle pivots, showing the normal position of the ball carrying pivot member in full lines and fore and aft positions of the ball carrying member relative to the socket member.
Figure 6:
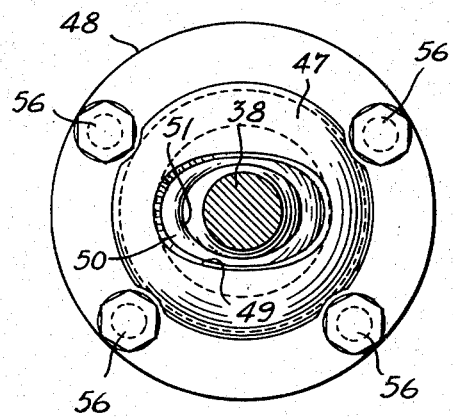
Fig. 6 is a vertical section taken on the line indicated at 6—6 in Fig. 5.

As best shown in Figs. 4 and 5, an inner pivot member 38 provided with a central ball-shaped enlargement 39 extends horizontally across the space between the arms 30 and 31 of the upper attaching member and has flattened ends 40 that are secured to the undersides of the arms 30 and 31 by means of bolts 41. As best shown in Figs. 2 and 3, a lower inner pivot member 42 provided with a ball-shaped enlargement 43 extends across the space between the arms 34 and 35 and has flattened end portions 44 that are secured against the undersides of the arms 34 and 35 by means of attaching bolts 45. The outer pivot members which encircle the ball portions 39 and 43 of the inner pivot members 38 and 42, are substantially identical and in the form of hollow ball receiving sockets, each comprising a front section 46 and a rear section 47 which are of substantially identical form. The sections 46 and 47 are both of substantially semi-spherical shape interiorly and each has a flat marginal flange 48 extending throughout its circumference. Each of the sections 46 and 47 has an arcuate slot 49 extending across the center thereof which is of a width to receive portions of either of the inner pivot members 38 or 42 on opposite sides of the ball-shaped enlargements 39 or 43 thereof. The sections 46 and 47 are assembled around the ball-shaped enlargements 39 and 43 with their flanges 48 disposed vertically and their slots 49 disposed horizontally. The internal diameter of the sections 46 and 47 is greater than the external diameter of the ball-shaped enlargements and elastic rubber bushings 50 are confined under radial compression between the outer pivot members and the ball-shaped enlargements, the bushings 50 extending circumferentially around the enlargements and having openings 51 that register with the openings 49 of the socket members.

The knuckle 2 has widened upper and lower ends 52 and 53 which are disposed in the spaces between the arms of the upper and lower attaching members 29 and 33, each end portion of the knuckle having an opening 54 which is formed to fit upon the front section 46 of an outer pivot member, the ends 52 and 53 of the steering knuckle being disposed between the front arms 30 and 34 of the attaching members, and the flanges 48 of the outer pivot members. The end portions 52 and 53 of the steering knuckle 2 have flat rear faces 55 that engage the front faces of the flanges 48 and bolts 56 extending through the flanges 48 and the end portions 52 and 53 of the steering knuckle rigidly attach the outer pivot members to the steering knuckle. The inner pivot members 38 and 42 may be forgings and the sections 46 and 47 of the outer pivot members may be stampings. Since the pivotal connections do not have bearing surfaces subject to abrasion, machining or surface hardening operations are unnecessary and, since there are no parts in rubbing contact, the knuckle joints require no lubrication. The elasticity of the rubber bushings provide knuckle joints that have limited universal movements and the rubber bushings provide cushions which are adapted to absorb shocks of impact and shocks resulting from sudden application of the wheel brakes.

The horizontally elongated slots 49 in the outer pivot members permit the pivotal movements of the steering knuckles necessary for steering the vehicle, and such pivotal movements are yieldingly resisted by the rubber bushings which exert a force on the wheels tending to return them to their normal position after they have been swung laterally whenever the steering thrust is released. The elastic bushings also dampen torsional vibrations and reduce the tendency of the wheels to wobble.

It is to be understood that in accordance with the provisions of the patent statutes, variations and modifications of the specific devices herein shown and described may be made without departing from the spirit of the invention.

What I claim is:

1. In a front wheel suspension, a steering knuckle mounting comprising upper and lower supporting members, a substantially upright steering knuckle having a laterally projecting wheel spindle and elastically cushioned universal connections between the upper and lower ends of said steering knuckle and said upper and lower supporting members, each of said connections comprising an inner pivot member in the form of a bar with a ball-shaped enlargement intermediate its ends and an outer pivot member in the form of an internally spherical socket surrounding said enlargement and having elongated diametrically opposite slots through which said bar extends, means rigidly securing one of the pivot members of each connection to said knuckle and the other to one of said supporting members, said bars and slots being horizontally disposed, and a bushing of elastic rubber surrounding the enlargement of each inner pivot member and under radial compression between said enlargement and the surrounding socket.

2. In a front wheel suspension, a steering knuckle mounting comprising upper and lower supporting members each having a pair of spaced arms, an inner pivot member carried by and extending horizontally across the space between the arms of each of said pairs, means rigidly securing each of said pivot members at its ends to the arms of the pair that carries it, each of said inner pivot members having a ball-shaped enlargement intermediate its ends, a wheel carrying steering knuckle having a laterally projecting steering arm, outer pivot members attached to the upper and lower ends of said knuckle and encircling said enlargements, each of said outer pivot members comprising two sections that are substantially semi-spherical internally, each section having a marginal circumferential flange and an arcuate slot extending across its center, the sections of each of said outer pivot members being secured together with their flanges disposed vertically and surrounding one of said enlargements and with their slots receiving said inner pivot members and disposed horizontally, and a hollow elastic rubber bushing confined between each outer pivot member and the ball-shaped enlargement of the inner pivot member which it encircles, each of said bushings having openings that register with the slots of said outer pivot members.

3. In a front wheel suspension, a steering knuckle mounting comprising upper and lower supporting members, each having a pair of spaced arms, inner pivot members each in the form of a bar having a ball-shaped enlargement intermediate its ends, each of said pivot members being carried by and extending horizontally across the space between the arms of one of said pairs, means rigidly securing each pivot member at its ends to the arms of the pair that carries it, an outer pivot member encircling each of said enlargements, each of said outer pivot members comprising front and rear sections that are substantially semi-spherical internally, each section having a marginal circumferential flange and an arcuate slot extending across its center, the sections of each outer pivot member being secured together with their flanges disposed vertically and surrounding one of said enlargements and with their slots disposed horizontally and receiving the portions of the inner pivot member on opposite sides of said enlargement, a hollow elastic rubber bushing confined between each outer pivot member and the ball-shaped enlargement of the inner pivot member which it encircles, each of said bushings having openings that register with the slots of said outer pivot members, and a steering knuckle having a laterally projecting wheel spindle and end portions that encircle said pivot members and that are bolted to the flanges of said outer pivot members.

4. In a front wheel suspension, a steering knuckle mounting comprising upper and lower supporting members, each having a pair of spaced arms, inner pivot members each in the form of a bar having a ball-shaped enlargement intermediate its ends, each of said pivot members being carried by and extending horizontally across the space between the arms of one of said pairs, means rigidly securing each pivot member at its ends to the arms of the pair that carries it, an outer pivot member encircling each of said enlargements, each of said outer pivot members comprising front and rear sections that are substantially semi-spherical internally, each section having a marginal circumferential flange and an arcuate slot extending across its center, the sections of each outer pivot member being secured together with their flanges disposed vertically and surrounding one of said enlargements and with their slots disposed horizontally and receiving the portions of the inner pivot member on opposite sides of said enlargement, a hollow elastic rubber bushing confined between each outer pivot member and the ball-shaped enlargement of the inner pivot member which it encircles, each of said bushings having openings that register with the slots of said outer pivot members, a steering knuckle having a laterally projecting wheel spindle and openings at its upper and lower ends that receive said pivot members and that are disposed transversely of said spindle, the upper and lower ends of said knuckle having rear faces that are recessed around said openings to fit the front section of each outer pivot member and that are engaged by the flange of said front section, and means rigidly securing the flanges of said outer pivot members to said knuckle.

5. In a front wheel suspension, a steering knuckle mounting comprising a vehicle frame cross member, upper and lower supporting links connected at their inner ends to said cross member by substantially horizontal pivots and extending beyond the end of said cross member, means resiliently resisting movements of said links relative to said cross member, attaching members in the form of a pair of spaced arms at the outer end of each of said links, an inner pivot member in the form of a horizontally disposed bar, carried by and extending across the space between the arms of each of said pairs, means rigidly securing each pivot member at its ends to the arms of the pair that carries it, each of said inner pivot members having a ball-shaped enlargement intermediate its ends, an outer pivot member encircling each of said enlargements, each of said outer pivot members comprising front and rear sections that are substantially semi-spherical internally, each section having a flat marginal flange and an arcuate slot across its center, the sections of each outer pivot member being secured together with their flanges disposed vertically and surrounding one of said enlargements and with their slots disposed horizontally and receiving portions of the inner pivot members between the ends thereof and said enlargements, and a steering knuckle having a laterally extending wheel spindle and upper and lower ends disposed between the spaced arms of said upper and lower attaching members, the upper and lower ends of said knuckle having openings through which said inner pivot members extend and being rigidly attached to said outer pivot members.

References Cited in the file of this patent

UNITED STATES PATENTS

| 546,631 | White | Sept. 17, 1895 |
| 2,234,803 | Leighton | Mar. 11, 1941 |
| 2,305,795 | Schieferstein | Dec. 22, 1942 |
| 2,507,108 | Lange | Mar. 9, 1950 |
| 2,652,221 | Kampa | Sept. 15, 1953 |

FOREIGN PATENTS

| 1,091,074 | France | Apr. 6, 1955 |
| 716,563 | Great Britain | Oct. 6, 1954 |